(12) United States Patent
Lin et al.

(10) Patent No.: US 10,701,343 B2
(45) Date of Patent: Jun. 30, 2020

(54) MEASUREMENT DEVICE AND PROCESSOR CONFIGURED TO EXECUTE MEASUREMENT METHOD

(71) Applicant: ASUSTeK COMPUTER INC., Taipei (TW)

(72) Inventors: Wei-Po Lin, Taipei (TW); Hao-Yuan Kuo, Taipei (TW); Keng-Te Liao, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 307 days.

(21) Appl. No.: 15/594,662

(22) Filed: May 15, 2017

(65) Prior Publication Data

US 2017/0347087 A1    Nov. 30, 2017

Related U.S. Application Data

(60) Provisional application No. 62/341,640, filed on May 26, 2016.

(30) Foreign Application Priority Data

Mar. 23, 2017   (TW) ............................ 106109804 A

(51) Int. Cl.
*H04N 13/261*    (2018.01)
*H04N 13/207*    (2018.01)
(Continued)

(52) U.S. Cl.
CPC ....... *H04N 13/261* (2018.05); *G06K 9/00208* (2013.01); *G06K 9/00281* (2013.01);
(Continued)

(58) Field of Classification Search
CPC .. H04N 13/261; H04N 13/207; H04N 13/239; G06T 7/337; G06K 9/00208; G06K 9/00281
(Continued)

(56) References Cited

U.S. PATENT DOCUMENTS 6,434,278 B1 *  8/2002  Hashimoto ............. G06T 17/00
                                                                345/583
7,620,217 B2   11/2009  Chen et al.
(Continued)

FOREIGN PATENT DOCUMENTS

CN          103535960 A       1/2014
CN          105222738 A       1/2016
(Continued)

*Primary Examiner* — Nathan J Flynn
*Assistant Examiner* — Caroline Somera
(74) *Attorney, Agent, or Firm* — CKC & Partners Co., LLC

(57) ABSTRACT

A measurement device adapted to cooperate with a three-dimensional image is provided. The three-dimensional image includes a plurality of three-dimensional positioning points. The measurement device comprises: a first camera unit for providing a two-dimensional image; an analysis module for analyzing the two-dimensional image to define a plurality of two-dimensional positioning points; a matching module for making the two-dimensional positioning points correspond to the three-dimensional positioning points, respectively, to generate a three-dimensional model; an input module for receiving a starting point and a destination in the two-dimensional image; a measurement module for obtaining first position information and second position information that correspond to the starting point and the destination respectively and calculating data; and an output module. A processor configured to execute a measurement method is also provided.

9 Claims, 4 Drawing Sheets

(51) Int. Cl.
*G06T 17/00* (2006.01)
*H04N 13/239* (2018.01)
*G06K 9/00* (2006.01)
*G06T 7/33* (2017.01)

(52) U.S. Cl.
CPC .............. *G06T 7/337* (2017.01); *G06T 17/00* (2013.01); *H04N 13/207* (2018.05); *H04N 13/239* (2018.05)

(58) Field of Classification Search
USPC .......................................................... 348/44
See application file for complete search history.

(56) References Cited

U.S. PATENT DOCUMENTS

| | | | |
|---|---|---|---|
| 8,933,996 B2 * | 1/2015 | Hashimoto | H04N 13/279 348/50 |
| 2007/0152037 A1 * | 7/2007 | Chen | G06K 9/00281 235/380 |
| 2011/0249117 A1 * | 10/2011 | Yoshihama | H04N 13/239 348/135 |
| 2011/0316987 A1 | 12/2011 | Komoriya et al. | |
| 2013/0230235 A1 * | 9/2013 | Tateno | G06T 19/003 382/154 |
| 2016/0328601 A1 * | 11/2016 | Ming | G06K 9/00248 |
| 2016/0379041 A1 * | 12/2016 | Rhee | G06K 9/00208 382/118 |
| 2018/0307310 A1 * | 10/2018 | McCombe | H04N 13/239 |
| 2019/0049240 A1 * | 2/2019 | Kawanishi | G01C 3/06 |
| 2019/0286884 A1 * | 9/2019 | Rhee | G06K 9/6271 |

FOREIGN PATENT DOCUMENTS

| | | |
|---|---|---|
| TW | 200725433 A | 7/2007 |
| TW | 201234838 A1 | 8/2012 |

* cited by examiner

MEASUREMENT DEVICE AND PROCESSOR CONFIGURED TO EXECUTE MEASUREMENT METHOD

CROSS-REFERENCE TO RELATED APPLICATION

This application claims the priority benefit of US provisional application Ser. No. 62/341,640, filed on May 26, 2016, and Taiwan application serial No. 106109804, filed on Mar. 23, 2017. The entirety of the above-mentioned patent applications are hereby incorporated by references herein and made a part of specification.

BACKGROUND OF THE INVENTION

Field of the Invention

The disclosure relates to a measurement device and a processor configured to execute a measurement method.

Description of the Related Art

With the development of e-commerce, almost all products can be purchased online. For example, glasses, clothes or wearable electronic devices are now can be purchased online anytime. However, this kind of products cannot be tried on to find out a suitable size, and the sizes of the products are usually inappropriate. The subsequent exchange or return process of these products are increased, which blocks the development of e-commerce.

BRIEF SUMMARY OF THE INVENTION

According to an aspect of the disclosure, a measurement device adapted to cooperate with a three-dimensional image is provided. The three-dimensional image includes a plurality of three-dimensional positioning points.

The measurement device comprises a first camera unit, an analysis module, a matching module, an input module, a measurement module and an output module. The first camera unit provides a two-dimensional image. The analysis module analyzes the two-dimensional image to define a plurality of two-dimensional positioning points in the two-dimensional image. The matching module makes the two-dimensional positioning points correspond to the three-dimensional positioning points, respectively, to generate a three-dimensional model. The input module receives a starting point and a destination in the two-dimensional image.

The measurement module obtains first position information and second position information that correspond to the starting point and the destination respectively from the three-dimensional positioning points, according to the three-dimensional model, and calculates data based on the first position information and the second position information. The output module outputs the data.

According to another aspect of the disclosure, a processor configured to execute a measurement method provided. The processor configured to execute a measurement method is adapted to cooperate with a three-dimensional image. The three-dimensional image includes a plurality of three-dimensional positioning points.

The processor executes the step as follows: controlling a camera unit to capture a target object to obtain a two-dimensional image via a first camera unit, analyzing the two-dimensional image to define a plurality of two-dimensional positioning points in the two-dimensional image, making the two-dimensional positioning points correspond to a plurality of three-dimensional positioning points, respectively, to generate a three-dimensional model; receiving a starting point and a destination in the two-dimensional image, obtaining first position information and second position information that correspond to the starting point and the destination, respectively, from the three-dimensional positioning points according to the three-dimensional model and calculating data based on the first position information and the second position information, and outputting the data.

In embodiments, the measurement device and the processor configured to execute the measurement method are provided. The two-dimensional positioning points correspond to the three-dimensional positioning points to generate the three-dimensional model. The data for the specific portion of the target object between any two three-dimensional positioning points is measured according to the three-dimensional model.

Compared to a two-dimensional measurement, the data for the specific portion of the human body that is measured between the two three-dimensional positioning points is more precise. The measurement device can be applied in online purchases. The data is transmitted to the merchant. Therefore, the buyer does not need to be at a shop/store and the merchant can also provide the customized product for the buyer according to the data for the specific portion of the human body.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
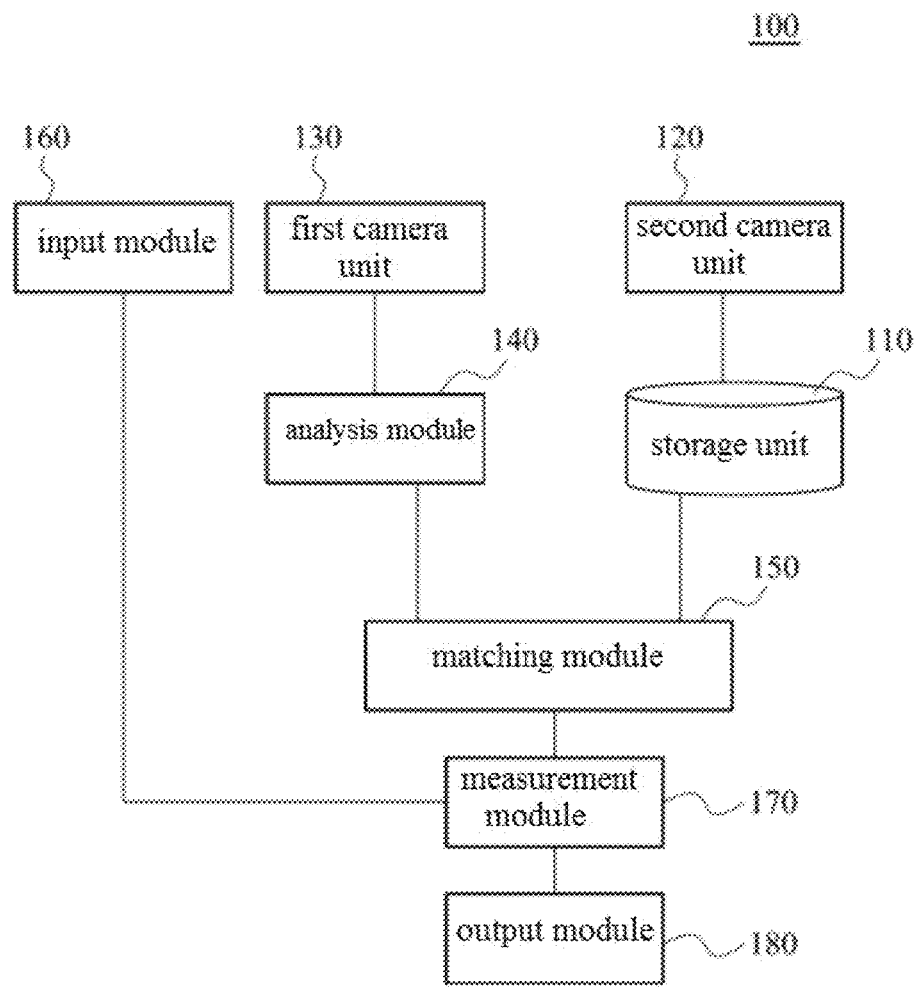
FIG. 1 is a measurement device in an embodiment.

Please refer to FIG. 1. FIG. 1 is a measurement device 100 in an embodiment. In an embodiment, a measurement device 100 includes a first camera unit 130, an analysis module 140, a matching module 150, an input module 160, a measurement module 170 and an output module 180. In an embodiment, the measurement device 100 further includes a second camera unit 120 and a storage unit 110.

In an embodiment, the first camera unit 130 is a camera unit (such as the camera unit of a smartphone) for capturing two-dimensional images.

In an embodiment, the second camera unit 120 is a depth camera unit (such as a depth camera).

In an embodiment, the differences among the second camera unit 120, the first camera unit 130 and a conventional camera are that the first camera unit 130 is configured to store a three-dimensional image of a real world as a two-dimensional (X-Y axis) image, and the second camera unit 120 is configured to measure a Z-axis distance between each image point. Consequently, the stored information is the three-dimensional spatial information.

In an embodiment, the second camera unit 120 includes at least two lens for capturing images, respectively. The second camera unit 120 compares the differences between the images from the two lens by using a current image processing algorithm to obtain the Z-axis information for the image point depth.

In an embodiment, by transmitting infrared rays to an imaged target, a distance between each reflection point and the second camera unit 120 is calculated according to reflected information.

In an embodiment, the analysis module 140, the matching module 150, the measurement module 170 are individually or integratedly implemented by a microcontroller, a microprocessor, a digital signal processor, an application specific integrated circuit (ASIC) or a logic circuit.

In an embodiment, the input module 160 and/or the output module 180 is implemented by a user interface. In an embodiment, a user inputs a message via the user interface. The measurement device 100 calculates according to the message to get a result. Then, the result is displayed by a user interface.

In an embodiment, the storage unit 110 is configured to store various kinds of information in a database. In an embodiment, the storage unit 110 is a memory, a hard disk, or a mobile memory card, which is not limited herein.

Figure 2:
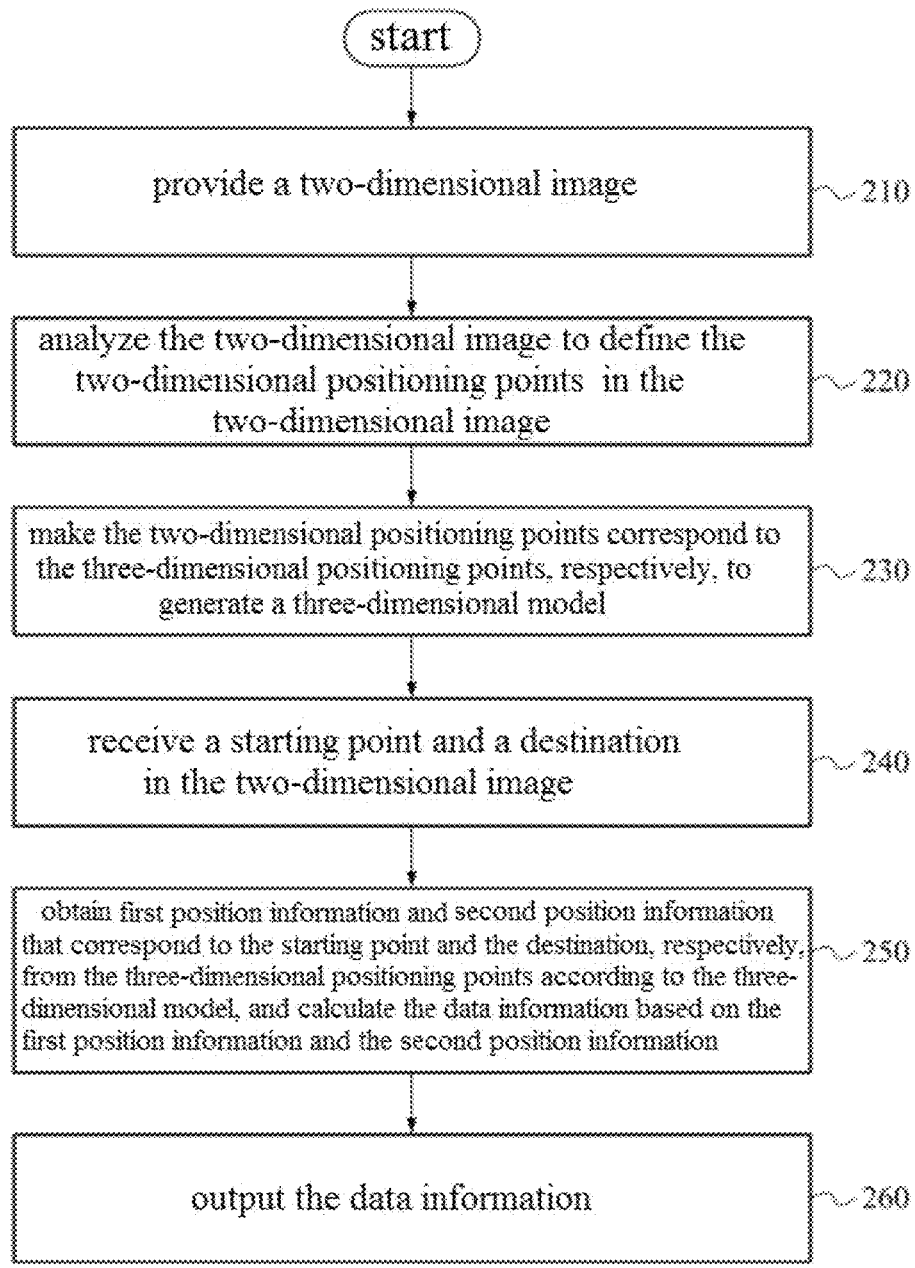
FIG. 2 is a flow chart of a measurement method that is executed by a processor in an embodiment.
Figure 3:
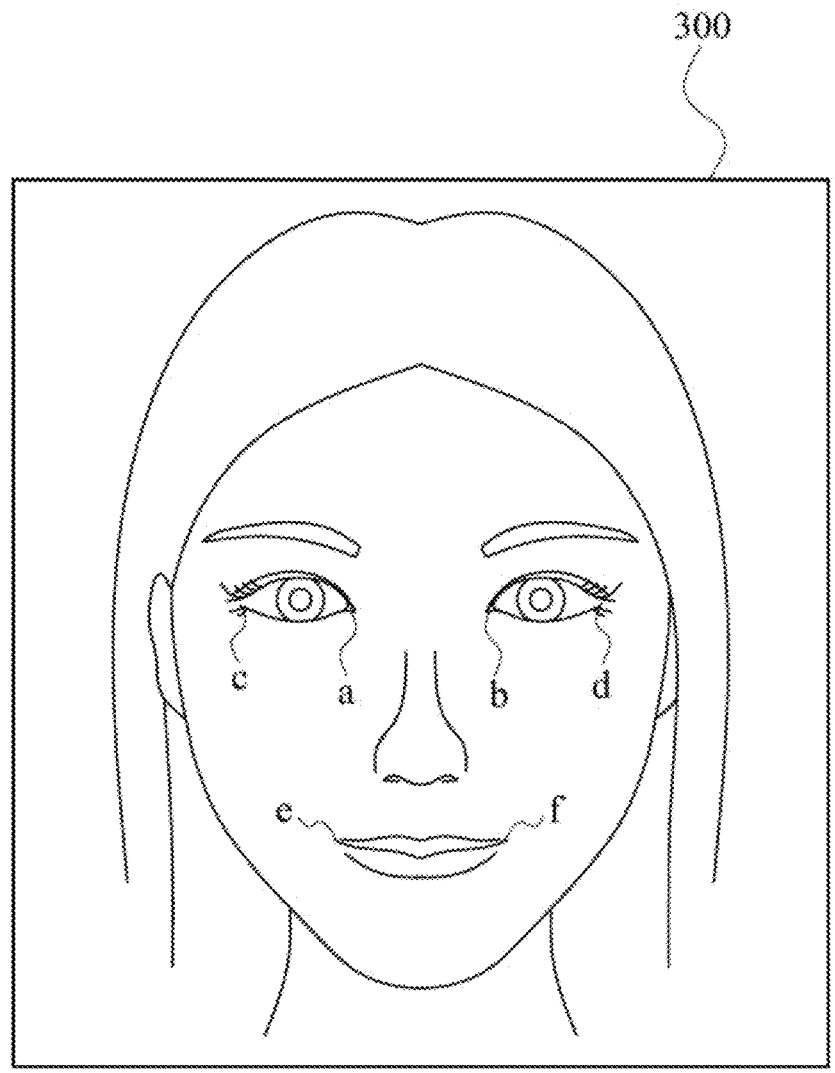
FIG. 3 is a two-dimensional image in an embodiment.
Figure 4:
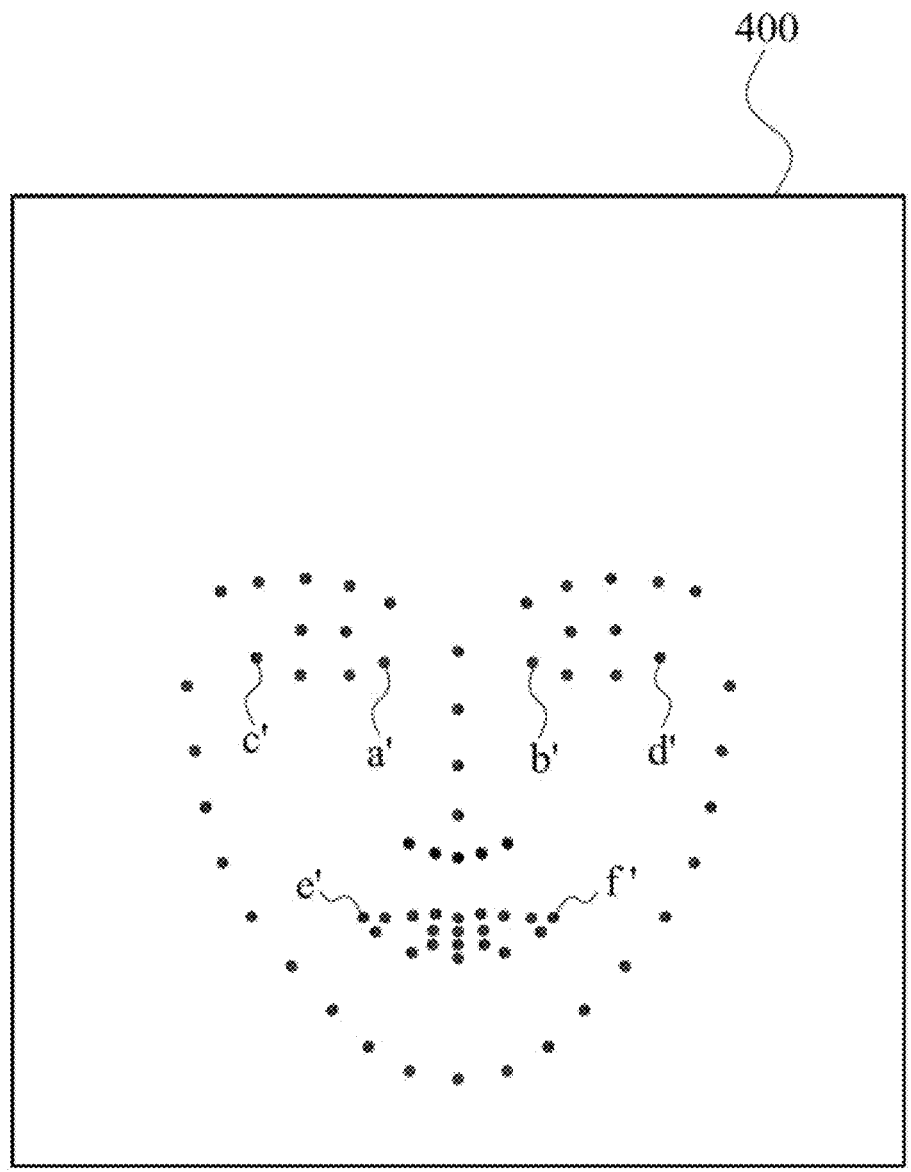
FIG. 4 is a three-dimensional model in an embodiment.

Please refer to FIG. 2 to FIG. 4. FIG. 2 is a flow chart of a measurement method 200 that is executed by a processor in an embodiment. FIG. 3 is a two-dimensional image 300 in an embodiment. FIG. 4 is a three-dimensional model 400 in an embodiment. The embodiments described hereinafter can be implemented by the measurement device 100 in FIG. 1. A sequence for steps of the measurement method 200 executed by the processor is not limited by the following embodiments. The sequence of steps is adjusted according to requirements.

In an embodiment, the measurement device 100 captures a target object via the second camera unit 120 to obtain a three-dimensional image and a plurality of three-dimensional positioning points a' to f' of the three-dimensional image. The three-dimensional image and the three-dimensional positioning points a' to f' are stored in the storage unit 110.

In an embodiment, the measurement device 100 does not include the second camera unit 120. The three-dimensional image of the target object and the three-dimensional positioning points a' to f' of the three-dimensional image needs to be obtained (from external devices). For example, in an embodiment, the measurement device 100 is a smartphone, which includes the first camera unit 130, but not includes the second camera unit 120.

In this case, the measurement device 100 establishes a wire or wireless communication with an external second camera unit 120 (such as a depth camera placed at a fixed position) to obtain the three-dimensional image of the target object and the three-dimensional positioning points a' to f' of the three-dimensional image from the second camera unit 120. The three-dimensional image of the target object and the three-dimensional positioning points a' to f' of the three-dimensional image are stored to the storage unit 110 by the measurement device 100.

In an embodiment, the measurement device 100 includes the first camera unit 130 and the second camera unit 120. Thus, the measurement device 100 obtains the three-dimensional image of the target object and the three-dimensional positioning points a' to f' of the three-dimensional image directly from the second camera unit 120.

In other words, in an embodiment, the three-dimensional image of the target object and the three-dimensional positioning points a' to f' of the three-dimensional image are obtained by the measurement device 100 before step 230.

In an embodiment, the target object is a face, a finger, an arm, limbs or the whole human body. In embodiments, the target object is a portion of the human body, which is not limited herein. In the following embodiment, the target object is a face.

In an embodiment, the second camera unit 120 is configured to capture a face image. While the face image is captured, the second camera unit 120 scans the face to obtain depth information of each point of the face and/or brightness information of red light, green light and blue light. Thus, the three-dimensional image of the face and the three-dimensional positioning points a' to f' of the three-dimensional image are obtained.

In an embodiment, the second camera unit 120 obtains the three-dimensional positioning points of the face by using a current face recognition algorithm (such as, by using feature points, skin color information, profile information) For example, 68 three-dimensional positioning points (all the points as shown in FIG. 4 are the three-dimensional positioning points) of the face are used.

In step 210, a two-dimensional image 300 is provided by the first camera unit 130.

In an embodiment, as shown in FIG. 3, the first camera unit 130 (such as the camera unit of the smartphone) captures a front face image, a side face image or a side-front face image to obtain the two-dimensional image 300.

In step 220, the analysis module 140 analyzes the two-dimensional image 300 to define the two-dimensional positioning points a to f (as shown in FIG. 3) in the two-dimensional image 300.

In an embodiment, the human face features is pre-stored into a face feature database by the measurement device 100. Thus, the analysis module 140 obtains the human face features from the face feature database and compares the human face features with the two-dimensional image 300 to define the two-dimensional positioning points a to f. The analysis module 140 obtains a plurality of two-dimensional plotted coordinates that correspond to the two-dimensional positioning points a to f, respectively, in the two-dimensional image 300. In an embodiment, for example, the coordinate (X, Y) for the two-dimensional positioning point a in the two-dimensional image 300 is (100, 110). The coordinate (X; Y) for the two-dimensional positioning point b in the two-dimensional image 300 is (120, 110).

In an embodiment, the two-dimensional positioning points a to f represent feature positioning points in the face, respectively, such as, an inner corner of the eye, an outer corner of the eye, a left corner of the mouth, a right corner of the mouth and so on.

In an embodiment, a current face recognition algorithm is applied to determine the two-dimensional positioning points a to f, which is not limited herein.

In FIG. 3, only the positioning points a to f are exemplified as the two-dimensional positioning points. In an embodiment, the number of the two-dimensional positioning points that the analysis module 140 obtains is more (for example, 68 two-dimensional positioning points are obtained), which is not limited herein.

In step 230, the matching module 150 makes the two-dimensional positioning points a to f correspond to the three-dimensional positioning points a' to f', respectively, to generate a three-dimensional model 400.

In an embodiment, the three-dimensional model 400 is used to present the three-dimensional positioning points a' to f' that correspond to the two-dimensional positioning points a to f, respectively.

In an embodiment, as shown in FIG. 4, the matching module 150 makes the two-dimensional positioning points a to f correspond to the three-dimensional positioning points a' to f', respectively, to generate the three-dimensional model 400. The three-dimensional positioning points a' to f' are shown on the three-dimensional model 400.

In the embodiment, each group of the two-dimensional positioning point (such as the two-dimensional positioning point e) and the corresponding three-dimensional positioning point (such as the three-dimensional positioning point e') indicate the same position (such as the left corner of the mouth) of the human face.

In other words, in step 230, the two-dimensional positioning points a to f are mapped to the three-dimensional positioning points a' to f', respectively, to generate the three-dimensional model 400.

In an embodiment, since the second camera unit 120 (such as the depth camera) is not easy to get by the user, in the above step, the three-dimensional image is pre-captured via the second camera unit 120 (such as the depth camera). Then, the three-dimensional image and the three-dimensional positioning points a' to f' are stored into the storage unit 110.

In subsequent steps, the first camera unit 130 (such as the camera unit of the smartphone) is used to capture the face image from different angles to obtain the two-dimensional images 300. Then, the two-dimensional positioning points a to f in the two-dimensional image 300 are mapped to the obtained three-dimensional positioning points a' to f' via the matching module 150 to generate the three-dimensional model 400 (for example, the three-dimensional model 400 is displayed on a display screen of the smartphone). The three-dimensional positioning points a' to f' are obtained from the storage unit 110 by the smartphone.

In an embodiment, the storage unit 110 is configured at a cloud server. The matching module 150 is implemented by the processor of the smartphone. The smartphone downloads the three-dimensional positioning points a' to f' from the storage unit 110 at the cloud server via the network to calculate.

Details that the two-dimensional positioning points a to fin the two-dimensional image 300 are mapped to the three-dimensional positioning points a' to f' by the matching module 150 to generate the three-dimensional model 400 is described hereafter.

In an embodiment, the three-dimensional positioning points a' to f' presented in the three-dimensional model 400 in FIG. 4 correspond to three-dimensional plotted coordinates, respectively. In an embodiment, for example, the coordinate (X, Y, Z) for the three-dimensional positioning point a' in the three-dimensional model 400 is (100, 110, 200). The coordinate (X, Y, Z) for the three-dimensional positioning point b' in the three-dimensional model 400 is (120, 110, 205).

In an embodiment, the matching module 150 is configured to rotate, translate the two-dimensional image 300, or adjust the size of the two-dimensional image 300 to make the two-dimensional positioning points a to f correspond to the three-dimensional positioning points a' to f', respectively.

In an embodiment, the matching module 150 makes the two-dimensional positioning points a to f correspond to the three-dimensional positioning points a' to f', respectively, according to a calibration parameter of the camera.

In an embodiment, the matching module 150 makes the two-dimensional positioning points a to f correspond to the three-dimensional positioning points a' to f', respectively, via a perspective projection model of the camera.

In an embodiment, when the number of the three-dimensional positioning points in a universal reference frame is n, the matching module 150 makes the two-dimensional positioning points correspond to the three-dimensional positioning points, respectively, by rotating or translating the two-dimensional image according to the two-dimensional positioning points, the calibration parameter of the camera and the six degree of freedom. The perspective projection model of the camera is presented as follows:

$$sp_c = K[R|T]p_w \, sp_c = K[R|T]p_w$$

wherein $p_w = [x \ y \ z \ 1]^T$ is a homogeneous world positioning point, the symbols x, y and z represent a real world coordinate system formed from the camera position to the homogeneous world positioning point. The symbol x represents an X-axis coordinate position. The symbol y represents a y-axis coordinate position. The symbol z represents a Z-axis coordinate position. $p_c = [u \ v \ 1]^T$ is a corresponding homogeneous image point. The symbol represents an X-axis position for the two-dimensional X-Y image. The symbol v represents a Y-axis position for the two-dimensional X-Y image. The symbol K is a matrix of the calibration parameter of the camera. The symbol s is a scale factor. The symbols R and T are the three-dimensional rotation and the three-dimensional movement required to take by the camera, respectively. Thus, the formula is presented as follows:

$$s \begin{bmatrix} u \\ v \\ 1 \end{bmatrix} = \begin{bmatrix} f_x & \gamma & u_0 \\ 0 & f_y & v_0 \\ 0 & 0 & 1 \end{bmatrix} \begin{bmatrix} r_{11} & r_{12} & r_{13} \\ r_{21} & r_{22} & r_{23} \\ r_{31} & r_{32} & r_{33} \end{bmatrix} \begin{bmatrix} x \\ y \\ z \\ 1 \end{bmatrix}$$

wherein the symbols $f_x$ and $f_y$ are proportion focal lengths. The symbol $\gamma$ is a tilt parameter. In an embodiment, the tilt parameter is set to 0. The symbol $(u_0, v_0)$ is a main positioning point. Thus, with the formula, the two-dimensional positioning points are made to correspond to the three-dimensional positioning points, respectively, by the rotation or translation of the two-dimensional image according to the two-dimensional positioning points, the calibration parameter of the camera and the six degree of freedom.

The symbol R includes an X-axis, Y-axis and Z-axis rotation coefficients $\gamma_{11}$ to $y_{33}$. In an embodiment, the X-axis rotation angle is $\alpha$. The Y-axis rotation angle is $\beta$. The Z-axis rotation angle is $\gamma$. The symbol R is defined as follows:

$$R = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}$$

$$= \begin{bmatrix} \cos(\beta)\cos(\gamma) & \sin(\alpha)\sin(\beta)\cos(\gamma) - \cos(\alpha)\sin(\gamma) & \sin(\alpha)\sin(\gamma) + \cos(\alpha)sing(\beta)\cos(\gamma) \\ \cos(\beta)\sin(\gamma) & \cos(\alpha)\cos(\gamma) + \sin(\alpha)\sin(\beta)\sin(\gamma) & \cos(\alpha)\sin(\beta)\sin(\gamma) - \sin(\alpha)\cos(\gamma) \\ -\sin(\alpha) & \sin(\alpha)\cos(\beta) & \cos(\alpha)\cos(\beta) \end{bmatrix}$$

wherein the symbol $t_1$, $t_2$, $t_3$ in the equation $T=[t_1 \ t_2 \ t_3]^T$ represent an X-axis displacement, a Y-axis displacement and a Z-axis displacement, respectively. According to the equation $sp_c=K[R|T]p_w$, the two-dimensional image coordinates for the six two-dimensional positioning points a to f ($P_c$) are introduced to correspond to the known three-dimensional real-world coordinates for the six three-dimensional positioning points a' to f' ($p_w$). A generalized least square method is applied to obtain R and T. Thus, the two-dimensional positions for the two-dimensional positioning points a to f in the two-dimensional image coordinate system are calibrated. The distance between any two points taken from the three-dimensional model represents a real distance (that is, the data).

In an embodiment, the algorithm for matching the two-dimensional positioning points to the three-dimensional positioning points is various, which is not limited herein.

In step 240, the input module 160 receives a starting point and a destination in the two-dimensional image 300. In an embodiment, the starting point is a positioning point of the inner corner of the left eye. The destination is a positioning point of the inner corner of the right eye.

In an embodiment, the user selects any two three-dimensional positioning points from the three-dimensional model 400 shown in FIG. 4 as the starting point and the destination. In an embodiment, for example, the user selects the three-dimensional positioning point a' as the starting point, and selects the three-dimensional positioning point b' as the destination. In another embodiment, the user selects the three-dimensional positioning point c' as the starting point, and selects the three-dimensional positioning point d' as the destination.

In step 250, the measurement module 170 obtains first position information and second position information that correspond to the starting point and the destination, respectively, from the three-dimensional positioning points according to the three-dimensional model. The measurement module 170 calculates to obtain the data based on the first position information and the second position information.

In step 260, the output module 180 outputs the data.

In an embodiment, when the user selects the three-dimensional positioning point a as the starting point and selects the three-dimensional positioning point b as the destination, the measurement module 170 calculates to obtain the data based on the position information of the starting point (i.e., the three-dimensional positioning point a') and the destination (i.e., the three-dimensional positioning point b'). Thus, the distance (such as 2 centimeters) between the inner corners of the left and right eyes on the face is obtained. The position information refers to the three-dimensional plotted coordinates.

In an embodiment, when the user selects the three-dimensional positioning point c as the starting point and selects the three-dimensional positioning point d as the destination, the measurement module 170 calculates to obtain the data based on the position information of the starting point (i.e., the three-dimensional positioning point c') and the destination (i.e., the three-dimensional positioning point d'). Thus, the distance (such as 18 centimeters) between the inner corners of the left and right eyes on the face is obtained.

Therefore, the user only needs to select any two three-dimensional positioning points as the starting point and the destination to obtain the actual data (such as the distance) between the two points.

In an embodiment, the steps 220 to 270 are performed via an application (APP). The application is installed on a smart device (such as a tablet, a smartphone and so on). The smart device captures the two-dimensional image 300 and analyzes the two-dimensional positioning points a to f in the two-dimensional image 300. The smart device obtains the three-dimensional positioning points a' to f' from the storage unit 110 (such as the storage unit of the smartphone or the cloud storage unit) and makes the two-dimensional positioning points a to f in the two-dimensional image 300 correspond to the three-dimensional positioning points a' to f', respectively, to generate the three-dimensional model 400.

The user selects any two three-dimensional positioning points (the starting point and the destination) on the three-dimensional model 400 via the input module 160 of the smart device. The data is calculated based on the starting point and the destination by the measurement module 170 of the smart device. The data is displayed by the output module 180. Thus, the user can know the data about the specific portion of the face (or body) via the measurement device 100.

In an embodiment, when the user uses the application for the measurement method to buy a product (such as a glass), the data about the specific portion (such as the inner corner of the eye) of the target object (such as the face) is measured by establishing the three-dimensional model. After the user obtains the data, the data is provided to a merchant server. In an embodiment, the data is automatically uploaded to the merchant server via the application. Thus, the merchant can select the product in a proper size for the buyer to achieve customization.

In sum, the measurement device and the processor configured to execute the measurement method are provided. The two-dimensional positioning points correspond to the three-dimensional positioning points to generate the three-dimensional model. The data for the specific portion of the target object between any two three-dimensional positioning points is measured according to the three-dimensional model. Compared to a two-dimensional measurement, the data for the specific portion of the human body that is measured by measuring the data based on the two three-dimensional positioning points is more precise. The measurement device can be applied in online purchases. The data is transmitted to the merchant. Therefore, the buyer does not need to be at a shop scene and the merchant provides the customized product for the buyer according to the data for the specific portion of the human body.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:
1. A measurement device, comprising:
   a first camera unit for capturing one two-dimensional image including a target object;
   a second camera unit for capturing a reference three-dimensional image including the target object, wherein the reference three-dimensional image comprises the two-dimensional image, a depth information of the two-dimensional image and a plurality of three-dimensional positioning points;
   a processor for analyzing the two-dimensional image to define a plurality of two-dimensional positioning points in the two-dimensional image, and wherein the processor is configured to map the two-dimensional positioning points to the three-dimensional positioning points of the reference three-dimensional image, respectively, to generate a three-dimensional model, wherein the three-dimensional positioning points are located on the three-dimensional model, and the three-dimensional positioning points comprise the depth information corresponding to the two-dimensional positioning points;

a user interface for selecting a starting point and a destination from the three-dimensional positioning points in the three-dimensional model;

wherein the processor is configured for obtaining first position information and second position information that correspond to the starting point and the destination, respectively, from the three-dimensional positioning points, according to the three-dimensional model, and calculating data based on the first position information and the second position information, wherein the first position information and second position information comprise the depth information of the starting point and the destination respectively;

wherein the user interface is configured for outputting the data, wherein the data comprises a distance between the starting point and the destination in the three-dimensional model.

2. The measurement device according to claim 1, wherein the processor obtains a plurality of human face features from a face feature database, and compares the human face features with the two-dimensional image to obtain a plurality of two-dimensional plotted coordinates for the two-dimensional positioning points in the two-dimensional image.

3. The measurement device according to claim 1, wherein the measurement device further include
a storage unit, wherein the reference three-dimensional image is stored in the storage unit.

4. The measurement device according to claim 1, wherein the processor is configured to rotate, translate the two-dimensional image, or adjust the size of the two-dimensional image, to make the two-dimensional positioning points correspond to the three-dimensional positioning points, respectively.

5. The measurement device according to claim 4, wherein the processor is further configured to make the two-dimensional positioning points correspond to the three-dimensional positioning points, respectively, according to a calibration parameter of a camera.

6. A processor configured to execute a measurement method, wherein the processor executes the steps as follows:
controlling a first camera unit to capture a two-dimensional image including a target object;
controlling a second camera unit to capture a reference three-dimensional image including the target object, wherein the reference three-dimensional image comprises the two-dimensional image, a depth information of the two-dimensional image, and a plurality of three-dimensional positioning points;
analyzing the two-dimensional image to define a plurality of two-dimensional positioning points in the two-dimensional image;
mapping the two-dimensional positioning points to the three-dimensional positioning points of the reference three-dimensional image, respectively, to generate a three-dimensional model, wherein the three-dimensional positioning points are located on the three-dimensional model, and the three-dimensional positioning points comprise the depth information corresponding to the two-dimensional positioning points;
selecting a starting point and a destination from the three-dimensional positioning points in the three-dimensional model;
obtaining a first position information and a second position information that correspond to the starting point and the destination, respectively, from the three-dimensional positioning points according to the three-dimensional model and calculating data based on the first position information and the second position information, wherein the first position information and second position information comprise the depth information of the starting point and the destination respectively; and
outputting the data, wherein the data comprises a distance between the starting point and the destination in the three-dimensional model.

7. The processor configured to execute the measurement method according to claim 6, wherein the processor executes the step as follows:
obtaining a plurality of human face features from a face feature database, and comparing the human face features with the two-dimensional image to obtain a plurality of two-dimensional plotted coordinates for the two-dimensional positioning points in the two-dimensional image.

8. The processor configured to execute the measurement method according to claim 6, wherein the processor is further configured to execute the step as follows:
rotating, translating the two-dimensional image, or adjusting the size of the two-dimensional image to make the two-dimensional positioning points correspond to the three-dimensional positioning points, respectively.

9. The processor configured to execute the measurement method according to claim 8, wherein the processor executes the step as follows:
making the two-dimensional positioning points correspond to the three-dimensional positioning points, respectively, according to a calibration parameter of a camera.

* * * * *